No. 792,396. PATENTED JUNE 13, 1905.
J. N. BUELL.
VEGETABLE CUTTER.
APPLICATION FILED JUNE 6, 1904.
3 SHEETS—SHEET 1.
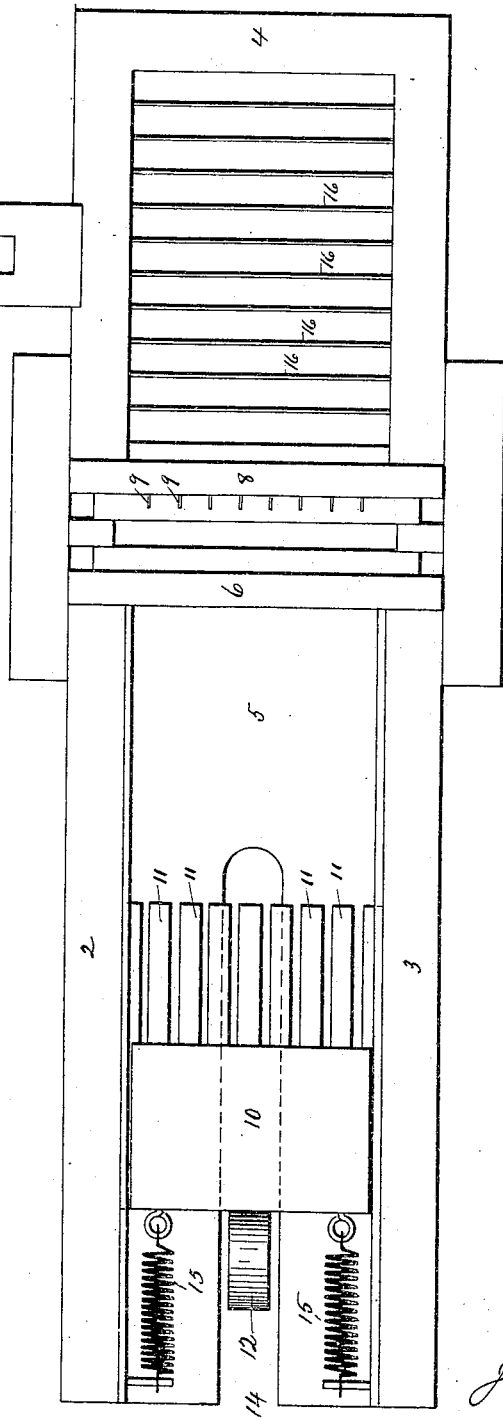

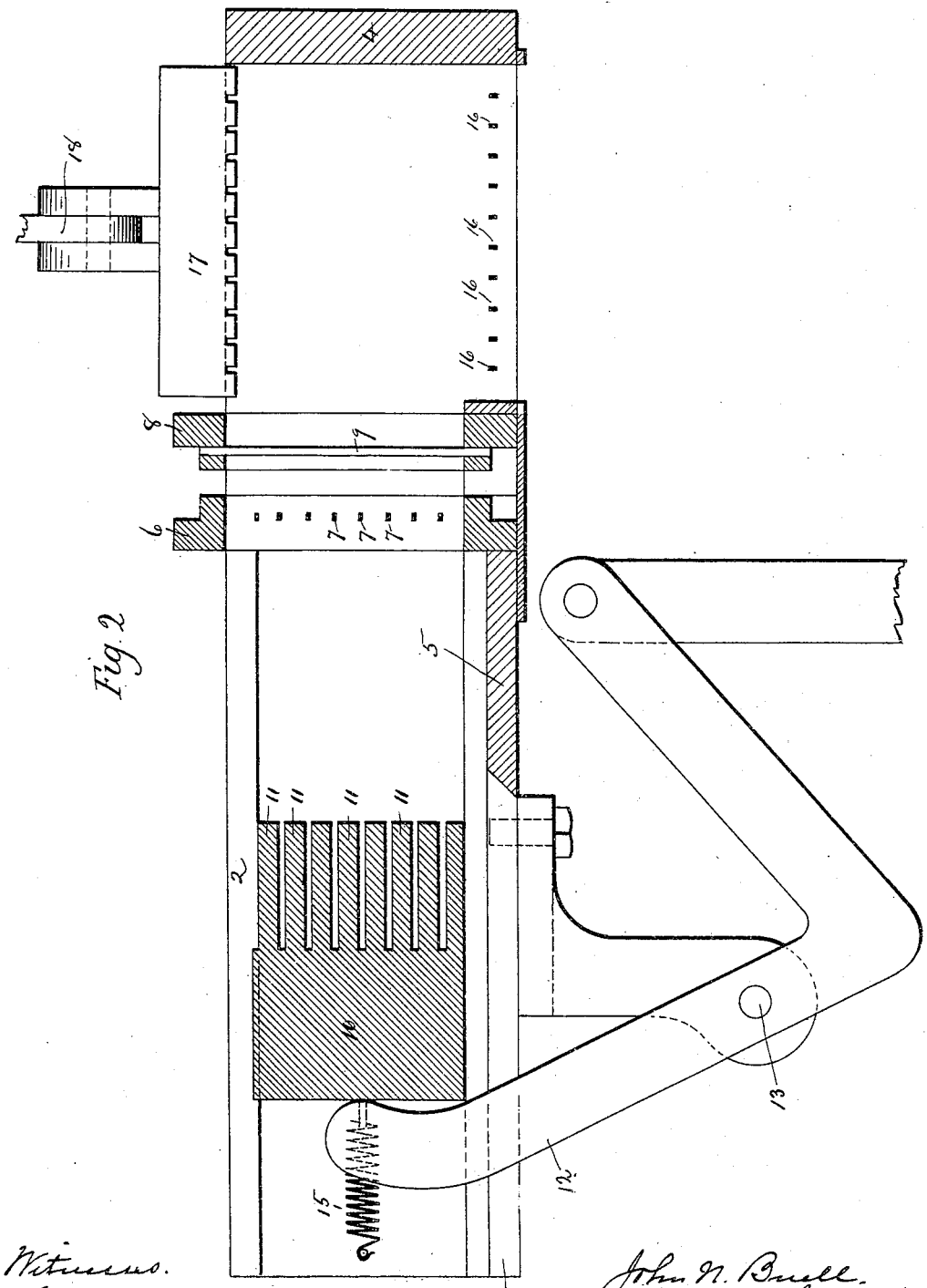

No. 792,396. PATENTED JUNE 13, 1905.
J. N. BUELL.
VEGETABLE CUTTER.
APPLICATION FILED JUNE 6, 1904.
3 SHEETS—SHEET 3.
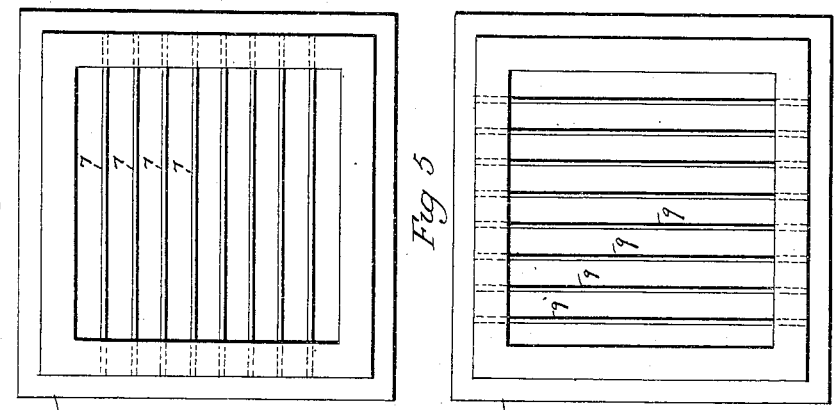
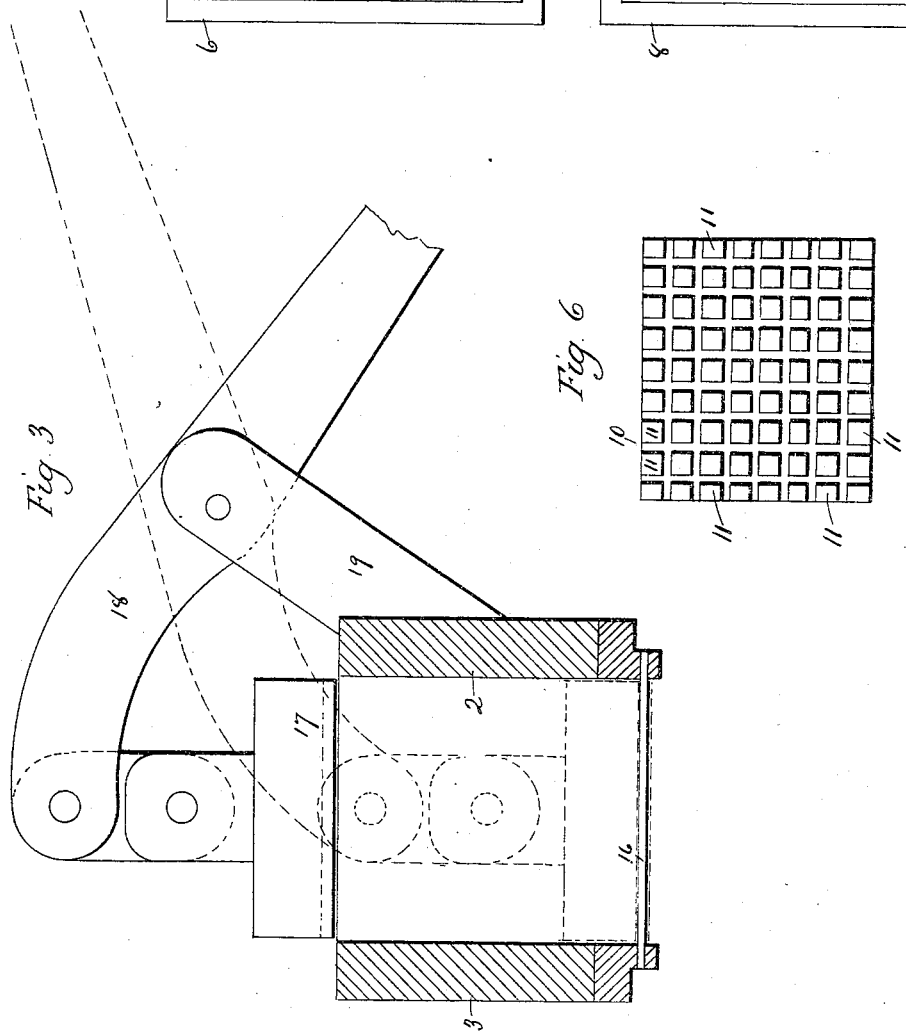

No. 792,396. Patented June 13, 1905.

UNITED STATES PATENT OFFICE.

JOHN N. BUELL, OF WEST HAVEN, CONNECTICUT, ASSIGNOR OF ONE-HALF TO WILLIAM A. RUSSELL, OF WEST HAVEN, CONNECTICUT.

VEGETABLE-CUTTER.

SPECIFICATION forming part of Letters Patent No. 792,396, dated June 13, 1905.

Application filed June 6, 1904. Serial No. 211,270.

*To all whom it may concern:*

Be it known that I, JOHN N. BUELL, of West Haven, in the county of New Haven and State of Connecticut, have invented a new and useful Improvement in Vegetable-Cutters; and I do hereby declare the following, when taken in connection with the accompanying drawings and the numerals of reference marked thereon, to be a full, clear, and exact description of the same, and which said drawings constitute part of this specification, and represent, in—

Figure 1, a top or plan view of a vegetable-cutter constructed in accordance with my invention with the plunger over the final cutters removed; Fig. 2, a side view in vertical longitudinal section; Fig. 3, a transverse sectional view through the outer end of the machine, showing the plunger depressed in broken lines; Fig. 4, a plan view of the cutter-frame with the transverse cutters; Fig. 5, a plan view of the frame with vertical cutters; Fig. 6, an end view of the plunger-fingers.

This invention relates to an improvement in vegetable-cutters, and while adapted for cutting various kind of vegetables it is particularly adapted for cutting potatoes where it is desirable to cut them into long strips or into small pieces, the object of the invention being a simple arrangement of parts wherein the potato may be readily cut into strips and where, if desired, the strips may be divided into small pieces; and the invention consists in the construction as hereinafter described, and particularly recited in the claim.

In carrying out my invention as herein shown I employ a trough-like box or frame comprising sides 2 3, end 4, and bottom 5. Transversely across the box is a frame 6, carrying a series of transverse cutting-blades 7, and adjacent to the frame 6 is a frame 8, carrying a series of vertically-arranged cutting-blades 9, the blades 7 and 9 being so arranged that a short space will be provided between them. Between the sides 2 and 3 and guided thereby is a plunger 10, carrying a series of rectangular fingers 11, so arranged that they may be passed between the blades 7 and 9. This plunger is moved toward the cutters by a lever 12, mounted upon a pivot 13 below the frame and operated by a treadle, (not shown,) the lever extending into the frame through a clearance-slot 14, formed in the bottom thereof, and the plunger is drawn rearward by means of springs 15, secured to the rear of the plunger and to the sides of the frame. Forward of the cutter-frame 8 the bottom of the box is open and provided with a series of transversely-arranged cutting-blades 16, and guided by the frame over these cutters is a plunger 17, which is adapted to be moved vertically in the box through a lever 18, mounted in a bracket 19, projecting upward above one side of the box.

In operation a vegetable—as, for instance, a potato—is placed in the box between the cutter-frame 6 and the fingers 11 of the plunger 10. The lever 12 is then turned, moving the plunger forward and forcing the potato through the frame 6, where it is sliced transversely, thence through the frame 8, where these slices are divided by the vertical knives, cutting the potato into square strips, the fingers 11 being adapted to freely pass between the cutters 7 and 9, so as to force the strips beyond the cutter-frame. These strips then fall upon the transverse cutters 16 and may be removed provided it is desired to use the potato in this form. If, however, small pieces are required, the plunger 17 will be forced downward by the lever 18, and the pieces of potato lying upon the cutter 16 will be pressed onto and through those cutters, severing the strips into cubes, it being understood that a suitable receptacle will be placed beneath the cutter 16 to receive the cut pieces.

By arranging the knives 7 and 9 at a slight distance apart a vegetable is more readily cut into strips than is possible when the cutters are arranged in the same plane, forming squares through which the entire potato must be forced at a single operation, as the separation of the horizontal and vertical cutters provides for the proper amount of expansion or play. After the vegetable has been passed through the cutters the lever 12 will be released and the plunger 10 drawn rearward by the springs 15 ready for the insertion of another piece to be cut.

While it is intended that the lever 12 shall be operated by a foot-treadle, it is apparent without further illustration or description that the plunger 10 might be moved by a hand-operated lever, and while it is intended that the lever 18 shall be operated by hand it is apparent that it might be operated by a foot-treadle. I therefore do not wish to be understood as limiting the invention to the exact construction shown, but hold myself at liberty to make such departures therefrom as fairly fall within the spirit and scope of my invention.

Having fully described my invention, what I claim as new, and desire to secure by Letters Patent, is—

A vegetable-cutter comprising a horizontally-arranged box open at its upper side, a rectangular frame extending transversely across the box and carrying a series of transverse cutting-plates, a second frame arranged forward of the first frame and parallel therewith, and having a series of vertical cutters, a horizontally-arranged plunger located in said box in rear of the first frame, said plunger formed with fingers adapted to pass through the two sets of cutters, a slot in the bottom of the rear end of the box, a lever pivotally connected below the box and extending upward through said slot into engagement with said plunger whereby said plunger may be moved forward thereby, a spring connected with the rear end of said plunger and with the rear of said box tending to draw the said plunger rearward, said box also formed with an opening in the bottom at its forward end, a series of transversely-arranged cutters in said opening, a bracket secured to one side of said frame, a lever mounted in said bracket and connected with said plunger whereby said plunger may be moved vertically in said box over the cutters in the bottom at the forward end thereof, substantially as described.

In testimony whereof I have signed this specification in the presence of two subscribing witnesses.

JOHN N. BUELL.

Witnesses:
J. H. SHUMWAY,
CLARA L. WEED.